United States Patent

Tsukamoto et al.

[11] Patent Number: 5,813,933
[45] Date of Patent: Sep. 29, 1998

[54] CONTINUOUSLY VARIABLE TRANSMISSION WITH BIAS SPRINGS ON THE DRIVE AND DRIVEN PULLEYS FOR SETTING A PREDETERMINED SPEED RATIO WHEN THE CUT IS IN NEUTRAL

[75] Inventors: Kazumasa Tsukamoto, Toyota; Takeshi Inuzuka; Masashi Hattori, both of Anjo; Takashi Furuya, Chiryu, all of Japan

[73] Assignee: Aisin AW Co., Ltd., Japan

[21] Appl. No.: 774,705

[22] Filed: Dec. 26, 1996

[30] Foreign Application Priority Data

Dec. 26, 1995 [JP] Japan .................................... 7-339713

[51] Int. Cl.⁶ ....................................................... F16H 9/26
[52] U.S. Cl. ................................ 474/11; 474/18; 474/28; 477/45
[58] Field of Search ................................ 474/11, 12, 18, 474/28, 29; 477/45, 48

[56] References Cited

U.S. PATENT DOCUMENTS

| 3,131,581 | 5/1964 | Graybill . | |
| 4,467,670 | 8/1984 | Kawamoto | 74/689 |
| 4,585,430 | 4/1986 | Gaddi | 474/28 X |
| 4,589,858 | 5/1986 | Gaddi | 474/28 |
| 4,644,820 | 2/1987 | Macey | 74/689 |
| 4,683,338 | 7/1987 | Snel et al. | 474/28 |
| 4,990,127 | 2/1991 | Roberts et al. . | |
| 5,050,457 | 9/1991 | Takayama et al. | 474/12 X |
| 5,334,104 | 8/1994 | Schuermans | 474/28 |
| 5,669,846 | 9/1997 | Moroto et al. | 477/45 X |

FOREIGN PATENT DOCUMENTS

| 370040 | 5/1990 | European Pat. Off. . |
| 4435779 | 4/1995 | Germany . |
| 6331000 | 11/1994 | Japan . |
| 2010423 | 6/1979 | United Kingdom . |

OTHER PUBLICATIONS

Patent Abstracts of Japan, vol. 12, No. 109 Apr. 8, 1988, 62 237166.
European Search Report, Mar. 18, 1997.
Abstract 96119290.3.

*Primary Examiner*—Khoi Q. Ta
*Attorney, Agent, or Firm*—Lorusso & Loud

[57] ABSTRACT

A continuously variable transmission has springs, which urge the movable sheaves of primary-side and secondary-side pulleys, set to achieve a pulley ratio $r_1$ approximate to or within a predetermined range of a neutral pulley ratio $r_N$ so that a vehicle takeoff response delay is eliminated when the driver shifts the transmission from a vehicle stop range (the P or N range) to the drive range (D range). This setting prevents a vehicle from moving backward when the driver shifts from the vehicle stop range to the D range immediately after starting the engine. The pulley ratio $r_1$ can be achieved either before or after the minimum required fluid pressure is supplied.

7 Claims, 7 Drawing Sheets

Clutch Engagement Table

| Range | Clutch | $C_L$ | $C_H$ |
|---|---|---|---|
| P | | | |
| R | | ○ | |
| N | | | |
| D | Low | ○ | |
| | High | | ○ |

CONTINUOUSLY VARIABLE TRANSMISSION WITH BIAS SPRINGS ON THE DRIVE AND DRIVEN PULLEYS FOR SETTING A PREDETERMINED SPEED RATIO WHEN THE CUT IS IN NEUTRAL

BACKGROUND OF THE INVENTION

1. Field of the Invention

The invention relates to continuously variable transmissions for motor vehicles or the like and, more particularly, to a continuously variable transmission having a planetary gear arrangement with a constant speed transmission mechanism.

2. Description of the Related Art

Among automatic transmissions installed in motor vehicles or the like, continuously variable transmissions are drawing attention as a alternative type of transmission differing from standard multi-speed automatic transmissions providing three or four forward speeds.

An example of a first type of continuously variable transmission is disclosed in U.S. Pat. No. 4,467,670 and employs a belt-type continuously variable transmission apparatus having a first pulley on the input side, a second pulley on the output side, and a V-type belt extending around the first and second pulleys. Movable sheaves of the first and second pulleys are hydraulically moved in the axial directions of the axis to change the clamping forces on the belt and to thereby change the pulley ratio, i.e. the radius of the belt passing of the second pulley divided by radius of the belt passing over the first pulley. Since the pulley ratio can be changed to any value between maximum and minimum values, this variable construction is called a continuously variable transmission (CVT). In a CVT, the pulley ratio shifts or increases toward the overdrive side if the hydraulically achieved clamping force of the first pulley is increased over that of the second pulley, and the pulley ratio shifts or decreases toward the underdrive side if the clamping force of the second pulley is higher.

Furthermore, the above described prior art CVT includes a return spring for the second pulley that adds to the second pulley clamping force to actively urge the pulley ratio toward the underdrive side, thereby preventing a delay in start of vehicle movement caused by a need to shift the CVT to the underdrive side. In many prior CVTs, one of the first and second pulleys is provided with a return spring to add to the belt clamping force to prevent the belt from slipping or even from falling off the pulleys when the hydraulic clamping force is zero. When the second pulley is provided with a return spring to add to the clamping force, the pulley ratio is urged to the underdrive side (the maximum pulley ratio), and when the first pulley is provided with a return spring, the pulley ratio is urged to the overdrive side (the minimum pulley ratio).

A example of a second type of prior art continuously variable transmission is disclosed in U.S. Pat. No. 4,644,820 and includes a chain-drive constant speed transmission mechanism and a planetary gear mechanism between the input and output shafts of a belt-type continuously variable transmission apparatus. The combination of the CVT with the constant speed transmission and the planetary gear mechanism increases the variable range along with increasing the torque range as well as enabling a change from a forward drive state to a neutral state and then to a reverse drive state of the vehicle by varying the pulley ratio.

In operation of the second type of CVT, it is necessary to establish the neutral state prior to starting movement of the vehicle, that is, it is necessary to set a predetermined pulley ratio to produce the neutral state. Since the predetermined pulley ratio is somewhere between the maximum and minimum pulley ratios, the hydraulic servo or servos controlling the pulley widths must be operated to change the pulley ratio from the maximum or minimum ratio to the predetermined ratio during takeoff operation if only one of the pulleys is provided with a return spring. Therefore, a delay is caused in starting vehicle movement (takeoff response delay) by the need to shift the pulley ratio.

SUMMARY OF THE INVENTION

Accordingly, it is an object of the invention to prevent a takeoff response delay caused by a need to shift a pulley in a continuously variable transmission having forward, neutral and reverse drive states and thus enable a smooth takeoff.

According to the invention, a continuously variable transmission with a planetary gear arrangement providing forward, neutral and reverse states includes an axial force control for first and second variable pulleys connected by a belt of the continuously variable transmission with first and second constant urging means biasing the respective first and second pulleys to a pulley ratio $r_1$ which is within a predetermined range of a pulley ratio $r_N$ corresponding to the neutral state. The pulley ratio $r_1$ is achieved when the vehicle is stopped and no torque is transmitted to the output shaft from the input shaft driven by an engine to thus reduce takeoff response delay.

In one embodiment, each of the first and second pulleys comprises a stationary sheave and a movable sheave that clamp the belt therebetween, and the first urging means and the second urging means are a first spring and a second spring, respectively, that force the corresponding movable sheaves to clamp the belt.

Also in a preferred embodiment, the axial force applying means comprises a first hydraulic chamber that receives a fluid pressure supply to urge the corresponding movable sheave in cooperation with the first spring, and a second hydraulic chamber that receives a fluid pressure supply to urge the corresponding movable sheave in cooperation with the second spring.

In one embodiment, the urging forces of the first and second springs are set such that the pulley ratio $r_1$ becomes approximate (within the predetermined range) to the pulley ratio $r_N$ before each of the first and second hydraulic chambers is supplied with a minimum required fluid pressure.

Preferably, the pulley ratio $r_1$ is a pulley ratio that achieves the forward drive state.

In a further embodiment, the continuously variable transmission of the invention further includes a running clutch that is engaged in a vehicle driving range. The urging forces of the first and second springs are set such that within a period between the start and the completion of engagement of the running clutch, the pulley ratio occurring after each of the first and second hydraulic chamber is supplied with the fluid pressure progresses toward the pulley ratio $r_N$.

In a still further embodiment, the urging forces of the first and second springs are set such that the pulley ratio $r_1$ becomes approximate to the pulley ratio $r_N$ after each of the first and second hydraulic chambers is supplied with a minimum required fluid pressure.

BRIEF DESCRIPTION OF THE DRAWINGS

The foregoing and further objects, features and advantages of the invention will become apparent from the following description of preferred embodiments with reference to the accompanying drawings, wherein.

DETAILED DESCRIPTION OF PREFERRED EMBODIMENTS

Preferred embodiments of the invention are described hereinafter with reference to the accompanying drawings.

Figure 1:
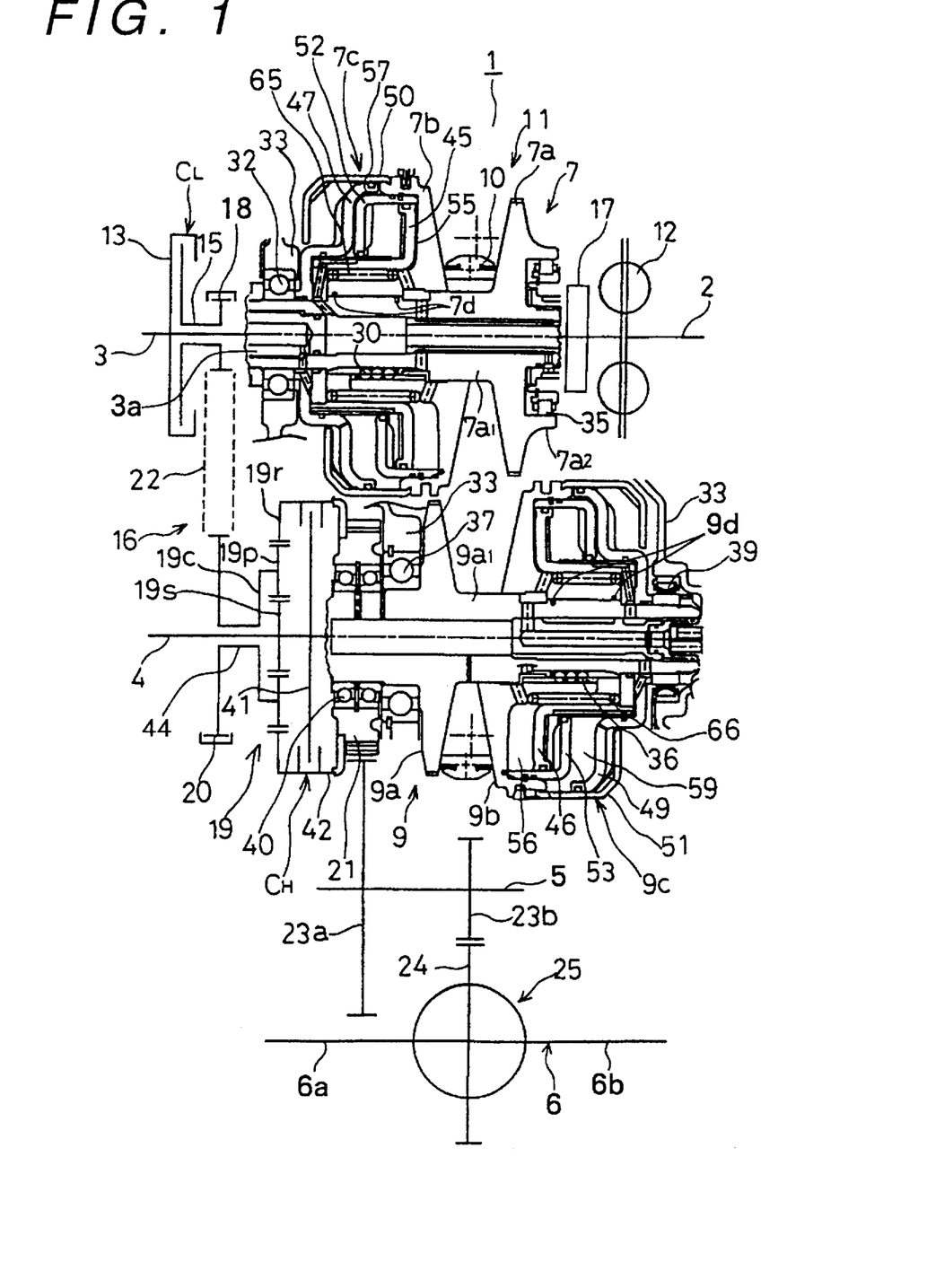
FIG. 1 is a front sectional view, partially shown in diagrammatic form, taken along various operational shafts of a continuously variable transmission according to the invention.
Figure 2:
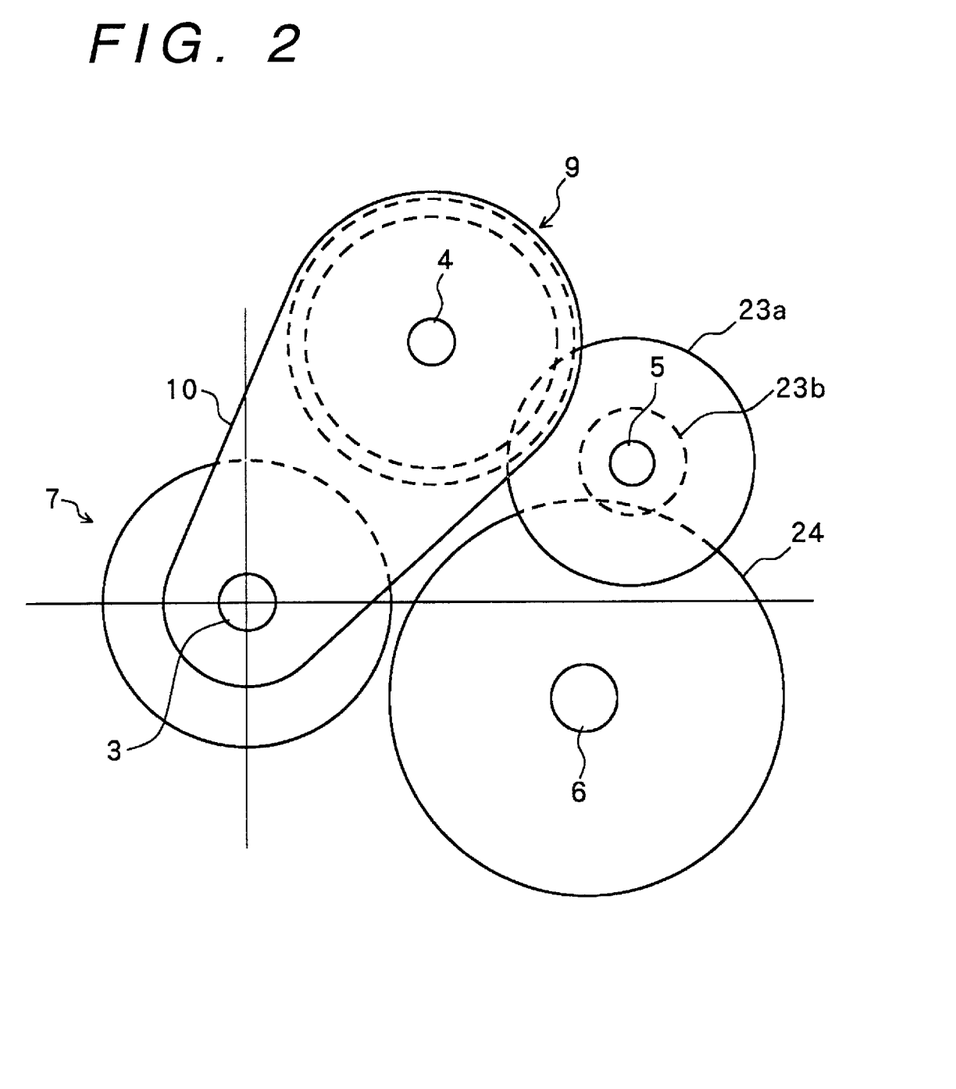
FIG. 2 is a side view of the continuously variable transmission of FIG. 1.

With reference to FIGS. 1 and 2 and the overall construction of a vehicular continuously variable automatic transmission (hereinafter referred to as "continuously variable transmission") 1, the continuously variable transmission includes as main components: a first shaft (input shaft) 3 drivingly connected to an engine crank shaft (engine output shaft) 2, a second shaft (output shaft) 4 drivingly connected to wheels of the vehicle, a belt-type continuously variable transmission apparatus 11, and a planetary gear mechanism 19. The belt-type continuously variable transmission apparatus (hereinafter, referred to as "CVT") 11 comprises a primary pulley (first pulley) 7 disposed on the first shaft 3, and a secondary pulley (second pulley) 9 disposed on the second shaft 4, a belt 10 extending around and connecting the pulleys 7, 9, and axial force applying means 7c, 9c for applying axial force to the pulleys 7, 9. The planetary gear 19 comprises a carrier 19c, a sun gear 19s, a ring gear 19r as first, second and third rotary elements.

The first shaft 3 and the second shaft 4 are disposed parallel to each other. Also disposed parallel to these shafts are a third shaft 5 forming a countershaft, and a fourth shaft 6 forming an axle connected to front wheels. The continuously variable transmission 1 is constructed so that the rotation generated by the engine is transmitted to the front wheels by the first shaft 3, the belt-type continuously variable transmission apparatus 11 with the planetary gear 19, the second shaft 4, the third shaft 5, and the fourth shaft 6. The continuously variable transmission is continuously variable in speed as well as having forward, neutral and reverse states.

The first or input shaft 3 is connected to an engine crank shaft 2 by a damper device 12 that absorbs engine torque fluctuation. A stationary sheave 7a and a boss 7a1 of the stationary sheave 7a of the primary pulley 7 are spline-fitted to a shaft portion 3a of the input shaft 3. This input shaft portion 3a is fixed to an input-side member 13 of a low clutch (running clutch) $C_L$, and rotatable supports an output-side member 15 of the low clutch $C_L$. The output member 15 is firmly connected to a primary-side sprocket 18 of a constant speed transmission apparatus 16. The input shaft 3 is connected to an oil pump 17. The stationary sheave 7a supports a movable sheave 7b in such a manner that the movable sheave 7b is movable in an axial direction. The movable sheave 7b is axially moved by a first hydraulic actuator 7c.

A stationary sheave 9a of the secondary pulley 9 is mounted on the second shaft 4. The stationary sheave 9a supports a movable sheave 9b in such a manner that the movable sheave 9b is movable in the axial direction. The movable sheave 9b is axially moved by a second hydraulic actuator 9c provided as an axial force applying means. Disposed on the second shaft 4 are a high clutch $C_H$ and the planetary gear 19. Further, a secondary-side sprocket 20 of the constant speed transmission apparatus 16 and an output gear 21 are rotatably supported by the second shaft 4.

The planetary gear 19 is a single pinion planetary gear arrangement including a sun gear 19s, a ring gear 19r and a carrier 19c rotatably supporting one or more pinions 19p meshing with the sun and ring gears. The sun gear (second rotary element) 19s is connected to the stationary sheave 9a of the secondary pulley 9 and the second shaft 4. The ring gear (third rotary element) 19r is connected to the output gear 21. The carrier (first rotary element) 19c is connected to the secondary-side sprocket 20. The primary-side and secondary-side sprockets 18, 20 are connected by a sprocket connector 22 such as a silent chain, a roller chain or a timing belt. The high clutch $C_H$ is disposed between the sun gear 19s and the ring gear 19r.

The output gear 21 meshes with a large gear 23a on the third shaft or countershaft 5. A small gear 23b on the shaft 5 meshes with a ring gear 24 of a differential 25. The differential 25 outputs rotation to the left and right axles 6a, 6b which are called the fourth shaft 6 while permitting relative or differential rotation between the left and right axles.

In the arrangement and construction of the continuously variable transmission 1, the boss $7a_1$ of the stationary sheave 7a of the primary pulley 7 supports the movable sheave 7b by a ball spline 30 so that the movable sheave 7b is freely movable in the axial direction. The first hydraulic actuator 7c is disposed behind the movable sheave 7b. At the left end side (as shown in FIG. 1) of the actuator 7c (the side remote from the engine crank shaft 2), the boss $7a_1$ is freely rotatably supported on a case 33 by a ball bearing 32. The stationary sheave 7a has a rim $7a_2$ formed on its back face, and is freely rotatably supported by a roller bearing 35 between the case and the inner peripheral face of the rim $7a_2$. Thus, the primary pulley 7 is supported at both ends by the aforementioned bearings 32, 35.

The oil pump 17 is disposed on the first shaft 3, between the damper device 12 and the stationary sheave 7a of the primary pulley 7. The primary-side sprocket 18 of the constant speed transmission apparatus 16 is disposed on the first shaft 3, at the left end side of the bearing 32 of the primary pulley 7. The low clutch $C_L$ is disposed on the left end side of the primary-side sprocket 18. Thus, the oil pump 17, the stationary sheave 7a and the movable sheave 7b of the primary pulley 7, the first hydraulic actuator 7c, the bearing 32, the primary-side sprocket 18 and the low clutch $C_L$ are arranged on the first shaft 3 in that order progressing from the engine side (base end side) to the left end side (as shown in FIG. 1) of the shaft.

The boss $9a_1$ of the stationary sheave 9a of the secondary pulley 9 supports the movable sheave 9b by a ball spline 36 so that the movable sheave 9b is movable in the axial direction. Disposed behind the movable sheave 9a is the second hydraulic actuator 9c. The secondary pulley 9 is provided with a ball bearing 37 disposed on the outer peripheral face of a boss on the back side of the stationary sheave 9a, and a roller bearing 39 disposed on the outer peripheral face of a boss on the back side of the hydraulic actuator 9c. These bearings 37, 39 are supported in the case 33 at both ends of the secondary pulley. The axial arrangements of the stationary and movable sheaves of the primary pulley 7 and the secondary pulley 9 are opposite to each other with respect to the belt 10. More specifically, the movable sheave 9b of the secondary sheave 9 and the hydraulic actuator 9c behind the movable sheave 9b are disposed on the engine side (base end side), and the stationary sheave 9a of the secondary sheave 9 is disposed on the left end side.

The output gear or shaft 21 is rotatably mounted on the second shaft 4, on the left end side of the bearing 37 of the stationary sheave 9a, by a ball bearing 40. Disposed on the left end side of the output shaft 21 is the high clutch $C_H$ which has an input-side member 41 fixed to the stationary sheave 9a of the secondary pulley 8 constituting the second shaft 4, and an output-side member 42 fixed to the output gear 21. The planetary gear 19 is disposed on the left end side of the high clutch $C_H$. A hollow intermediate shaft 44 is rotatably supported on the left end side of the planetary gear 19. The intermediate shaft 44 connects the secondary-side sprocket 20 of the constant speed transmission apparatus 16 to the carrier 19c of the planetary gear 19. Thus, the second hydraulic actuator 9c, the movable sheave 9b, the stationary sheave 9a, the output shaft 21, the high clutch $C_H$, the planetary gear 19, and the secondary sprocket 20 of the constant speed transmission apparatus 16 are arranged on the second shaft 4, in that order going from the engine side (base end side) to the left end side of the shaft.

The hydraulic actuators 7c, 9c of the primary and secondary pulleys 7, 9 comprise cylinder members 47, 49 and partition members 45, 46 fixed to the stationary sheave bosses $7a_1$, $9a_1$, and second piston members 52, 53 and drum members 50, 51 fixed to the back sides of the movable sheaves 7b, 9b, respectively. The partition members 45, 46 are oil-tightly fitted to the second piston members 52, 53, and the second piston members 52, 53 are oil-tightly fitted to the cylinder members 47, 49 and the partition members 45, 46, thus forming double piston structures having a first hydraulic chamber 55 and a third hydraulic chamber 57, and a second hydraulic chamber 56 and a fourth hydraulic chamber 59, respectively.

In the first hydraulic chamber 55 and the second hydraulic chamber 56 of the hydraulic actuators 7c, 9c, the piston faces are formed by the back side faces of the movable sheaves 7b, 9b. The primary and secondary pulleys 7, 9 have equal effective pressurized areas on their piston faces. The stationary sheave bosses $7a_1$, $9a_1$ of the primary and secondary pulleys have fluid passages connecting to the first hydraulic chamber 55, the second hydraulic chamber 56, the third hydraulic chamber 57, and the fourth hydraulic chamber 59. The primary pulley 7 and the secondary pulley 9 are provided with a pre-loading spring (first urging means) 65 and a pre-loading spring (second urging means) 66 that urge the movable sheaves 7b, 9b toward the stationary sheaves 7a, 9a, respectively. The loads (urging forces) of the pre-loading springs 65, 66 are suitably set as described later.

In the arrangement as shown in FIG. 1, the damper device 12 and the oil pump 17 on the first shaft 3 overlap the second hydraulic actuator 9c of the secondary pulley 9 on the second shaft, in the axial direction. The planetary gear 19, the high clutch $C_H$ and the output gear 21 on the second shaft 4, disposed between the stationary sheave 9a and the secondary-side sprocket 20 of the constant speed transmission apparatus 16, overlap the first hydraulic actuator 7c of the primary pulley 7 disposed on the first shaft 3, in the axial direction.

In a side view as shown in FIG. 2, the lines connecting the first shaft 3, the second shaft 4, the third shaft 5 and the fourth shaft 6 form a distorted quadrilateral. When installed in a vehicle, they are arranged in the order of the first, second, fourth and third shafts, starting from the front, and in the order of the second shaft 4, the third shaft 5, the first shaft 3 and the fourth shaft 6, starting from the top.

The foregoing arrangement and construction of the continuously variable transmission 1 advantageously achieves a size reduction of the entire system, particularly, a size reduction in the axial direction.

The operation of the above-described continuously variable transmission 1 will be described with reference to FIGS. 1, 3 and 4. The clutch engagement table of FIG. 4 indicates clutch engagement by a symbol O and disengagement by blanks.

The revolution of the engine crank shaft 2 is transmitted to the input shaft 3 by the damper device 12. In a low mode of the D (drive) range where the low clutch $C_L$ is engaged and the high clutch $C_H$ is disengaged, the rotation of the input shaft 3 is transmitted to the primary pulley 7, and also transmitted to the carrier 19c of the planetary gear 19 by the primary-side sprocket 18, the sprocket connector 22 and the secondary-side sprocket 20 of the constant speed transmission apparatus 16. The rotary speed of the secondary pulley 9 as driven by the belt 10 from the primary pulley 7 can be changed to any value within a continuous range by suitably adjusting the pulley ratio (indicated by "CVT RATIO" in drawings) of the primary and secondary pulleys using the hydraulic actuators 7c, 9c. The speed-controlled rotation of the pulley 9 is transmitted to the sun gear 19s of the planetary gear 19.

Figure 3:
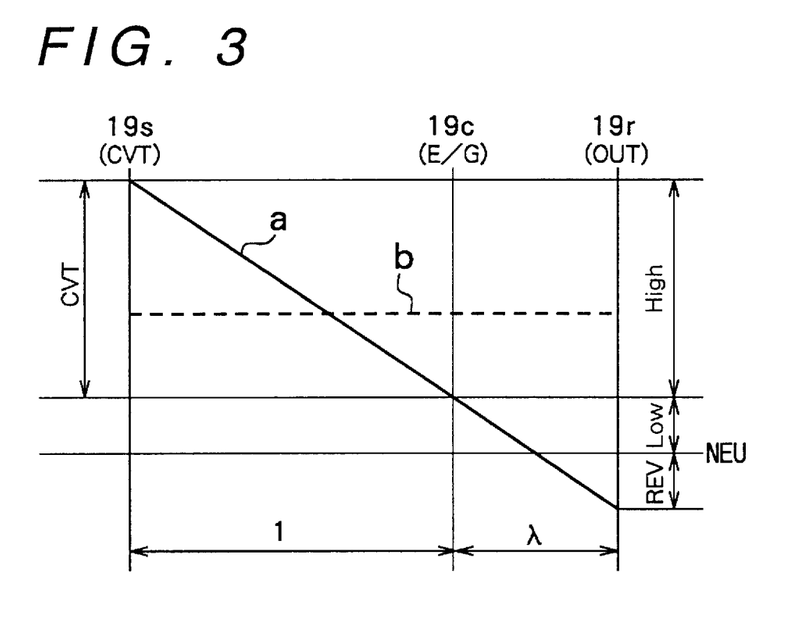
FIG. 3 is a speed graph of the continuously variable transmission.

In the planetary gear 19, the speed-controlled rotation from the belt-type continuously variable transmission apparatus (CVT) 11 is transmitted to the sun gear 19s while the carrier 19c is receiving the constant speed rotation from the constant speed transmission apparatus 16 and thereby the pinions 19p serve as reaction elements driving the ring gear 19r and the output gear or shaft in forward, neutral and reverse directions, as indicated in the speed graph of FIG. 3. The resultant rotation of the ring gear is a function of the rotations of the carrier 19c and the sun gear 19s as well as the difference between the rotations of the carrier and the sun gear. When the rotation speed of the sun gear 19s exceeds the rotation speed of the carrier 19c, the pinions 19p rotate in a reverse direction so that the difference between the rotation speeds of the sun gear and the carrier reduces the rotation speed of the ring gear 19r relative to the rotation speed of the carrier 19c; one difference of rotation speeds results in zero rotation of the ring gear 19r; and a still larger difference results in reverse rotation of the ring gear 19r. In this low mode where the low clutch $C_L$ is engaged, the output shaft can rotate in the forward (low) and reverse directions, intervened by zero-rotation. Also in this low mode, the output torque increases as the difference in relative rotations of the sun gear 19s and the carrier 19c causes the rotative speed of the ring gear 19r to approach zero.

In this process, because the output shaft 4 is connected to the ring gear 19r, which is a rotary element other than the reaction force support element, the planetary gear 19 undergoes torque circulation, and the sun gear 19s and the carrier 19c rotate in the same direction, so that the output shaft can rotate in the forward (Low) and reverse directions, intervened by zero-rotation. In accordance with the aforementioned torque circulation, torque is transmitted from the secondary pulley 9 to the primary pulley 7 of the CVT 11 while the output shaft 4 is rotating in the forward direction (forward drive), and torque is transmitted from the primary pulley 7 to the secondary pulley 9 while the output shaft 4 is rotating in the reverse direction (reverse drive).

In a high mode where the low clutch $C_L$ is disengaged and the high clutch $C_H$ is engaged, the torque transmission to the planetary gear 19 through the constant speed transmission apparatus 16 is disconnected, and the sun gear 19s, the carrier 19c and the ring gear 19r of the planetary gear 19 rotate integrally as a unit due to the engagement of the high clutch $C_H$. Thus the rotation of the input shaft 3 is transmitted to the output gear 21 by the CVT 11 and the high clutch $C_H$. That is, the rotative speed of the output 21 relative to the rotative speed of the input shaft 2 is solely a function of the pulley or CVT ratio of the CVT 11 transmitting drive force from the primary pulley 7 to the secondary pulley 9. The rotation of the output gear 21 is transmitted to the differential 25 by gears 23a, 23b of the countershaft 5, and then to the right and left front wheels by the right and left axles 6a, 6b.

Figure 5:
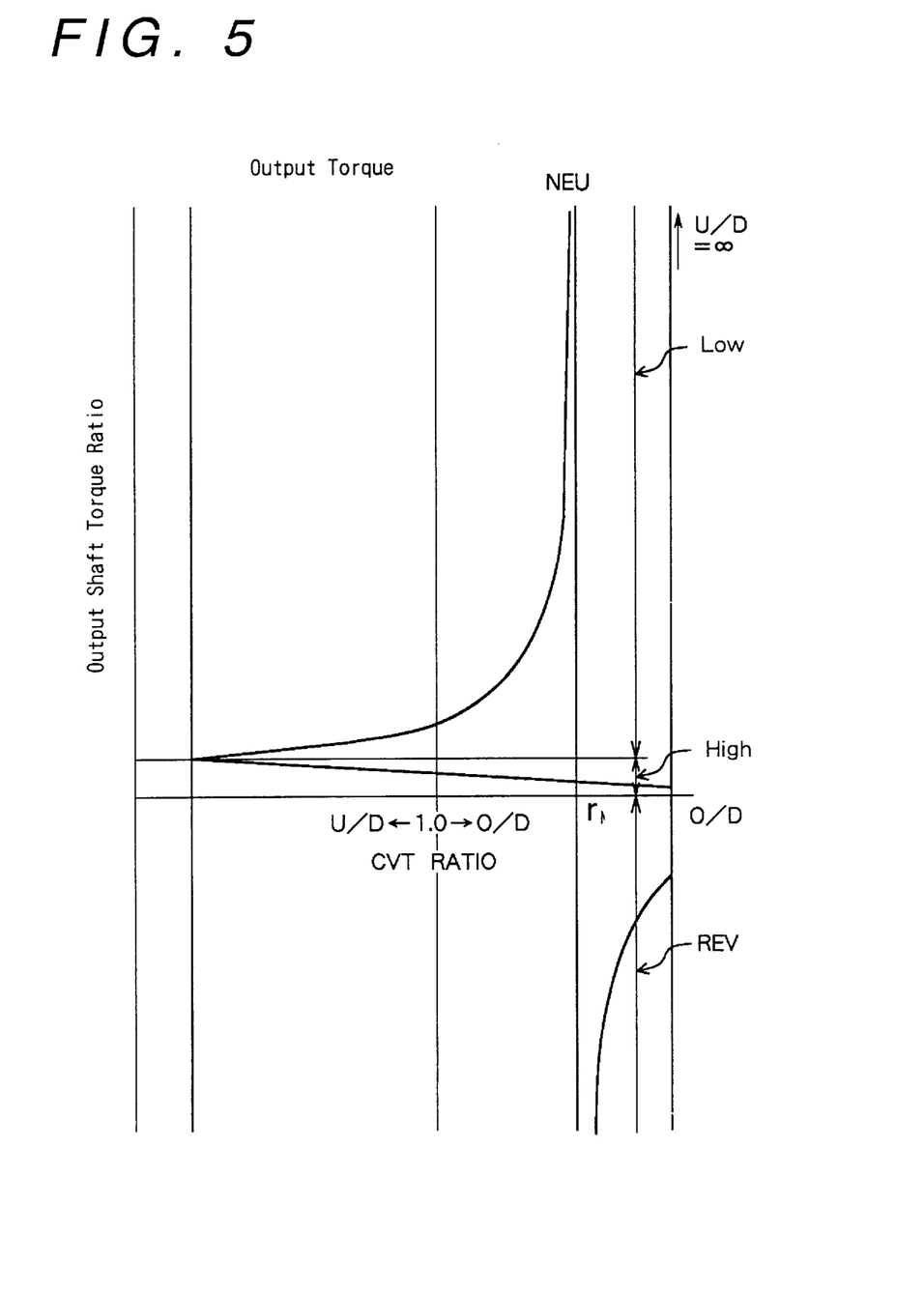
FIG. 5 is a graph indicating the change of the output torque with respect to the pulley ratio of the belt-type continuously variable transmission apparatus (CVT)
Figure 6:
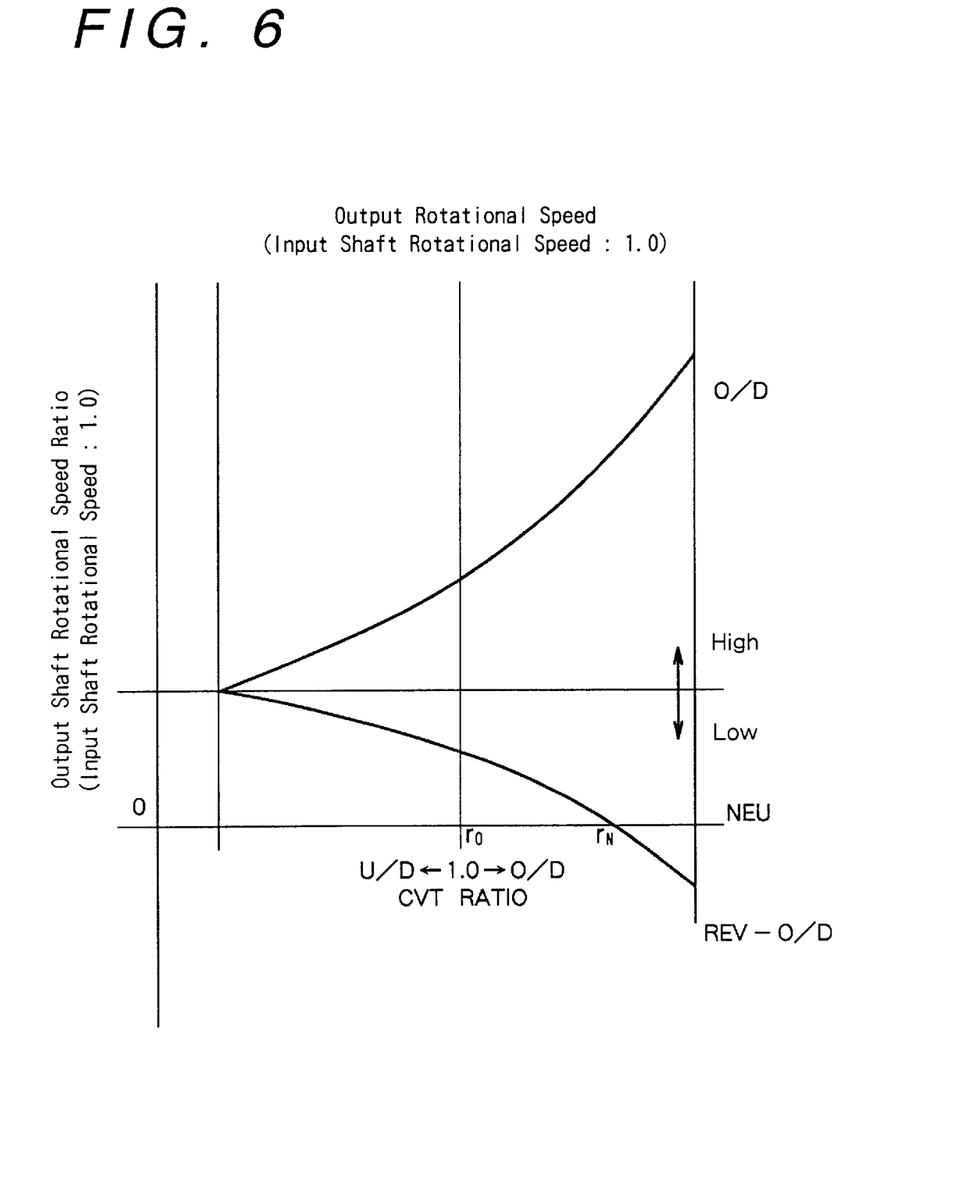
FIG. 6 is a graph indicating the change of the output rotational speed with respect to the pulley ratio of the CVT.

As indicated in the speed graph of FIG. 3, the output torque graph of FIG. 5, and the output rotational speed graph of FIG. 6, operation is performed in the low mode as follows. If the pulley ratio (CVT RATIO) of the CVT 11 is at the limit (O/D limit) in the speed increase direction (overdrive) (in a position indicated by the right lower end of the solid line "a" in FIG. 3), the ring gear 19r rotates reversely in response to the constant speed rotation of the carrier 19c and transmits the reverse rotation (REV) to the output gear 21 because the sun gear 19s rotates at the maximum speed in this situation. If the CVT 11 is shifted in the speed decrease direction (underdrive), the reverse rotation slows and, when the pulley ratio reaches a ratio determined by the gear ratios of the planetary gear 19 and the constant speed transmission apparatus 16, the CVT 11 assumes the neutral position (NEU) where the rotation of the output gear 21 becomes zero. If the CVT 11 is further shifted in the speed decrease direction, the rotation of the ring gear 19r is switched to the forward direction and forward rotation, that is, forward drive rotation, is transmitted to the output gear 21. As indicated in the graph of FIG. 5, the torque of the output gear 21 theoretically diverges to infinity in the vicinity of the neutral position NEU or zero output rotation.

When the CVT 11 is shifted to a limit in the speed decrease (U/D) direction limit, the low clutch $C_L$ is disengaged and the high clutch $C_H$ is engaged to switch to the high mode. In this high mode, the output rotation of the CVT 11 is directly transmitted to the output gear 21; the broken line b parallel to the abscissa axis of the speed graph of FIG. 3 corresponds to a pulley or CVT ratio of about 1. As the pulley ratio of the CVT 11 is shifted in the speed increase (O/D) direction as shown in FIG. 6, the speed of rotation of the output gear 21 relative to the input speed increases in the (O/D) direction while the transmitted torque, FIG. 5, correspondingly decreases. The symbol "λ" in FIG. 3 represents a ratio (Zs/Zr) of the number Zs of teeth of the sun gear and the number Zr of teeth of the ring gear while "1" represents the unitary rotation of the planetary gear.

Figure 4:
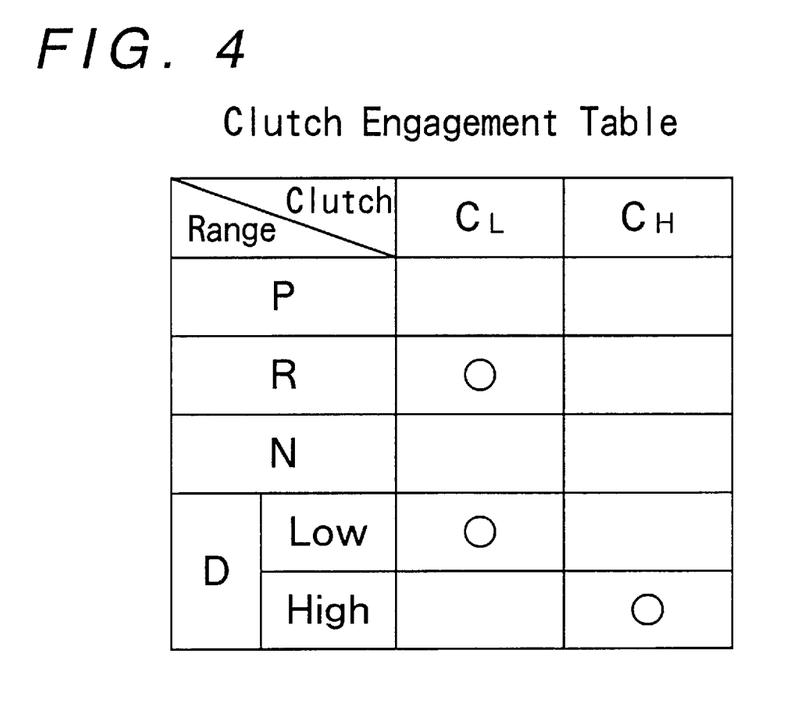
FIG. 4 is a table showing the engagement states of the clutches.

In the P (parking) range and the N (neutral) range shown in the clutch engagement table of FIG. 4, both the low clutch $C_L$ and the high clutch $C_H$ are disengaged, and the transmission of drive force from the engine (E/G) is disconnected. In the P range, the differential 25 is locked, and the axles 6a, 6b are also locked.

In the low mode of the D range, the fluid pressure from the oil pump 17 is supplied to the hydraulic servo for the low clutch $C_L$, so that the low clutch $C_L$ is engaged. At the same time, the axial force produced by the second hydraulic actuator 9c of the secondary pulley 9 of the CVT 11 receiving fluid pressure in both the second and fourth hydraulic chambers 56, 59 is greater than the axial force by the first hydraulic actuator 7c receiving fluid pressure only in the first hydraulic chamber 55, so that the pulley or CVT ratio is set at the limit in the U/D direction. By suitably adjusting the operation of a ratio control valve and the relative axial force condition of the pulleys 9, 7, the fluid pressure in the fourth hydraulic chamber 59 of the second hydraulic actuator 9c can be adjusted so that axial force by the hydraulic actuator 9c is suitably adjusted to change the pulley ratio in the O/D direction. The engine rotation transmitted to the carrier 10c of the planetary gear 19 by the input shaft 3, the low clutch $C_L$ and the constant speed transmission apparatus 16 in this condition is changed by the rotation of the sun gear 19s in the CVT 11 in accordance with the predetermined pulley ratio to correspondingly change the rotation of the output gear 21 via the ring gear 19r.

In the high mode of the D range, a predetermined fluid pressure from the oil pump 17 is supplied to the first and third hydraulic chambers 55, 57 of the first hydraulic actuator 7c of the primary pulley 7, and also supplied to the second hydraulic chamber 56 of the second hydraulic actuator 9c of the secondary pulley 9 in addition to being supplied to the high clutch hydraulic servo. In this high mode, the CVT 11 is in the D range position as in the low mode, the high clutch $C_H$ engages, and the axial force produced by the first hydraulic actuator 7c of the primary pulley 7 of the CVT 11 receiving fluid pressure in both the first and third hydraulic chambers 55, 57 is greater than the axial force by the second hydraulic actuator 9c receiving fluid pressure only in the second hydraulic chamber 56. By suitably adjusting the ratio control valve and the axial force condition controlling the torque transmission from the primary pulley 7 to the secondary pulley 9, the fluid pressure in the third hydraulic chamber 57 of the first hydraulic actuator 7c of the primary pulley 7 is adjusted, so that axial force by the hydraulic actuator 7c is suitably adjusted, thus achieving a suitable pulley ratio (torque ratio). In this high mode, the engine torque transmitted via the input shaft 3 is suitably changed by the CVT 11 transmitting from the primary pulley 7 to the secondary pulley 9, and then applied to the output gear 21 via the high clutch $C_H$.

In the R (reverse) range, a predetermined hydraulic pressure is supplied to the first and third hydraulic chambers 55, 57, and is also supplied to the third hydraulic chamber 56 of the second actuator 9c of the secondary pulley 9 in addition to being supplied to the low clutch hydraulic servo. Thereby the low clutch $C_L$ is engaged, and the axial force produced by the first hydraulic actuator 7c of the primary pulley 7 of the CVT 11 receiving fluid pressure in both the first and third hydraulic chambers 55, 57 is greater than the axial force by the second hydraulic actuator 9c receiving fluid pressure only in the second hydraulic chamber 56 to produce an axial force condition controlling the torque transmission from the primary pulley 7 to the secondary pulley 9. By adjusting the ratio control valve, the fluid pressure in the third hydraulic chamber 57 of the first hydraulic actuator 7c of the primary pulley 7 is adjusted, so that axial force by the hydraulic actuator 7c is suitably adjusted, thus achieving a suitable pulley ratio (torque ratio). In this reverse state, the pulley ratio of the CVT 11 is in a predetermined speed increase (O/D) state, and engine torque from the input shaft 3 is transmitted to the carrier 19c of the planetary gear 19 by the low clutch $C_L$ and the constant speed transmission apparatus 16 and to the sun gear 19s by the CVT 11 transmitting torque from the primary pulley 7 to the secondary pulley 9. The two torques are combined by the planetary gear 19, and the resultant torque is output as reverse rotation from the ring gear 19r to the output gear 21.

Finally described will be the setting of the urging forces of the first and second urging means of the axial force applying means in the continuously variable transmission 1 having the foregoing construction and functions, more specifically, the setting of the spring loads of the first spring 65 of the planetary side and the second spring 66 of the secondary side.

The continuously variable transmission 1 performs neutral control when the vehicle is taking off. The neutral control during takeoff is necessary because of the following circumstances. The continuously variable transmission 1 enables the employment of only the simple damper device 12 to transmit the engine torque from the engine output shaft 2 to the input shaft 3, thus omitting the conventionally required takeoff devices, such as a torque converter, a fluid coupling, an electromagnetic powder clutch, an input clutch, etc. To enable this simple construction, it is necessary for the continuously variable transmission 1 to perform so-called neutral control that initially sets the pulley ratio to a ratio that achieves the neutral state of the continuously variable transmission 1 and thereby prevents torque transmission to the output shaft 4 when a vehicle is stopped in the low mode of the D range, where the low clutch $C_L$ is engaged.

The engine is first started in the P or N range (vehicle stop range). Thus the oil pump 17 supplies equal fluid pressure to the first hydraulic chamber 55 of the first hydraulic actuator 7c of the primary pulley 7 and the second hydraulic chamber 56 of the second hydraulic actuator 9c of the secondary pulley 9, so that the movable sheaves 7b, 9b move toward the stationary sheaves 7a, 9a and clamp the belt 10. The movable sheaves 7b, 9b are pre-urged toward the stationary sheaves 7a, 9a by the first and second springs 65, 66. The forces of the fluid pressure and the springs 65, 66 balance the pulleys 7, 9 at a predetermined pulley ratio $r_1$. Then when the transmission is shifted from a vehicle stop range (P or N) to the D range (low mode) for takeoff, the low clutch $C_L$ is engaged and the neutral control starts so that the pulleys 7, 9 are brought to a pulley ratio $r_N$ corresponding to the neutral state (the pulley ratio $r_N$ is less than 1 according to this embodiment). The continuously variable transmission 1 thus is made ready for takeoff or starting of vehicle movement. In response to depression of the accelerator pedal, fluid pressure is supplied to the fourth hydraulic chamber of the secondary pulley so that the pulley ratio shifts from the pulley ratio $r_N$ for the neutral state toward the U/D side as indicated in FIG. 6. As a result, the continuously variable transmission 1 is shifted to the U/D side for forward acceleration.

The pulley ratio $r_N$ corresponding to the neutral state is specifically determined by the construction of the planetary gear 19, the speed ratio of the constant speed transmission apparatus 16, etc. The detail of the neutral control is described in Japanese patent application Nos. HEI-7-66234 and HEI-7-128701.

By the neutral control during the shift from the vehicle stop range to the D range (low mode) for vehicle takeoff, the pulley ratio is changed from the ratio $r_1$ to the pulley ratio $r_N$ for the neutral state before actually starting movement of the vehicle. Therefore, if the change from the pulley ratio $r_1$ to the pulley ratio $r_N$ requires a relatively long time, a response delay occurs in vehicle takeoff.

Figure 7:
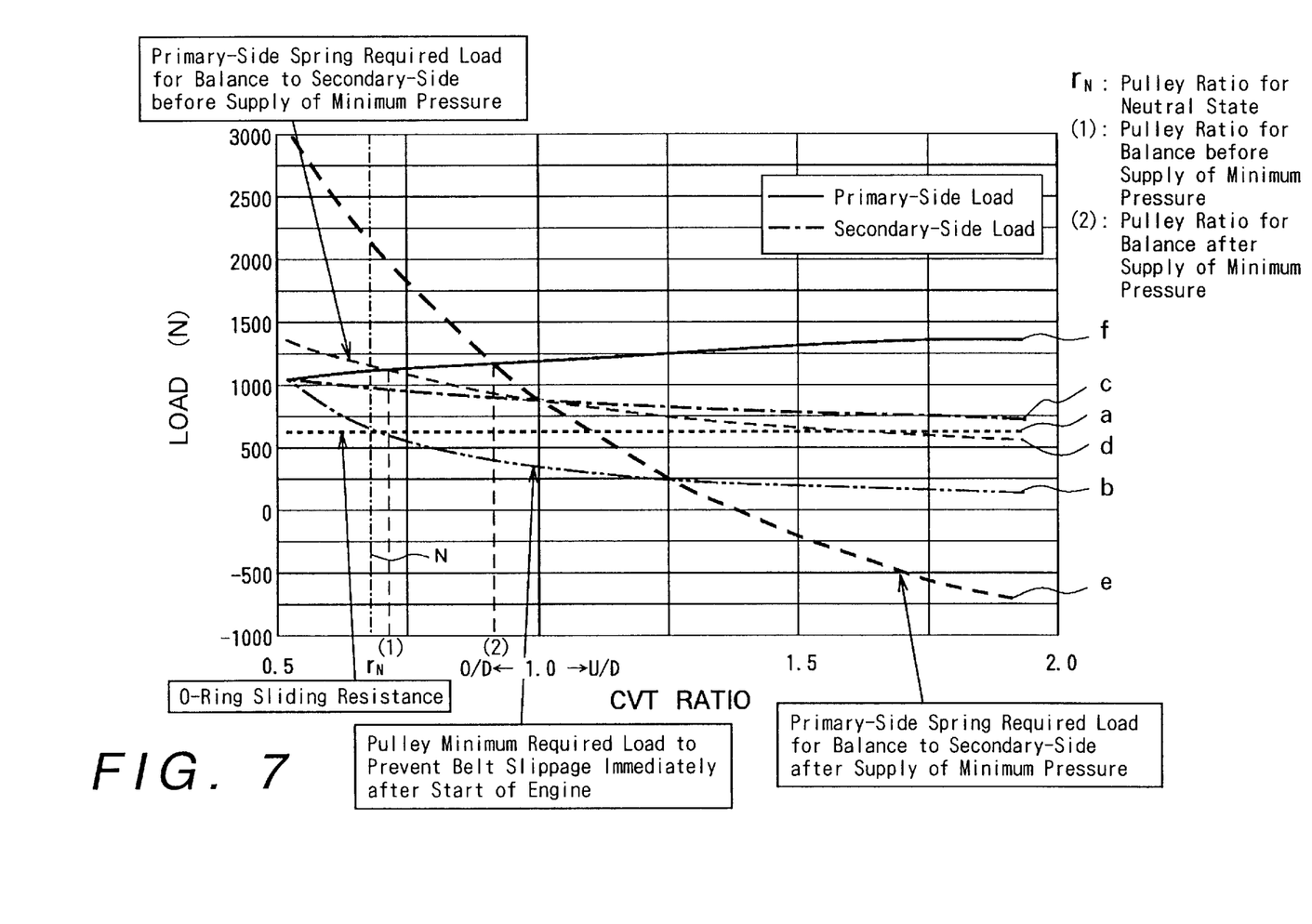
FIG. 7 is a graph illustrating spring load settings to achieve a predetermined pulley ratio.
Figure 8:
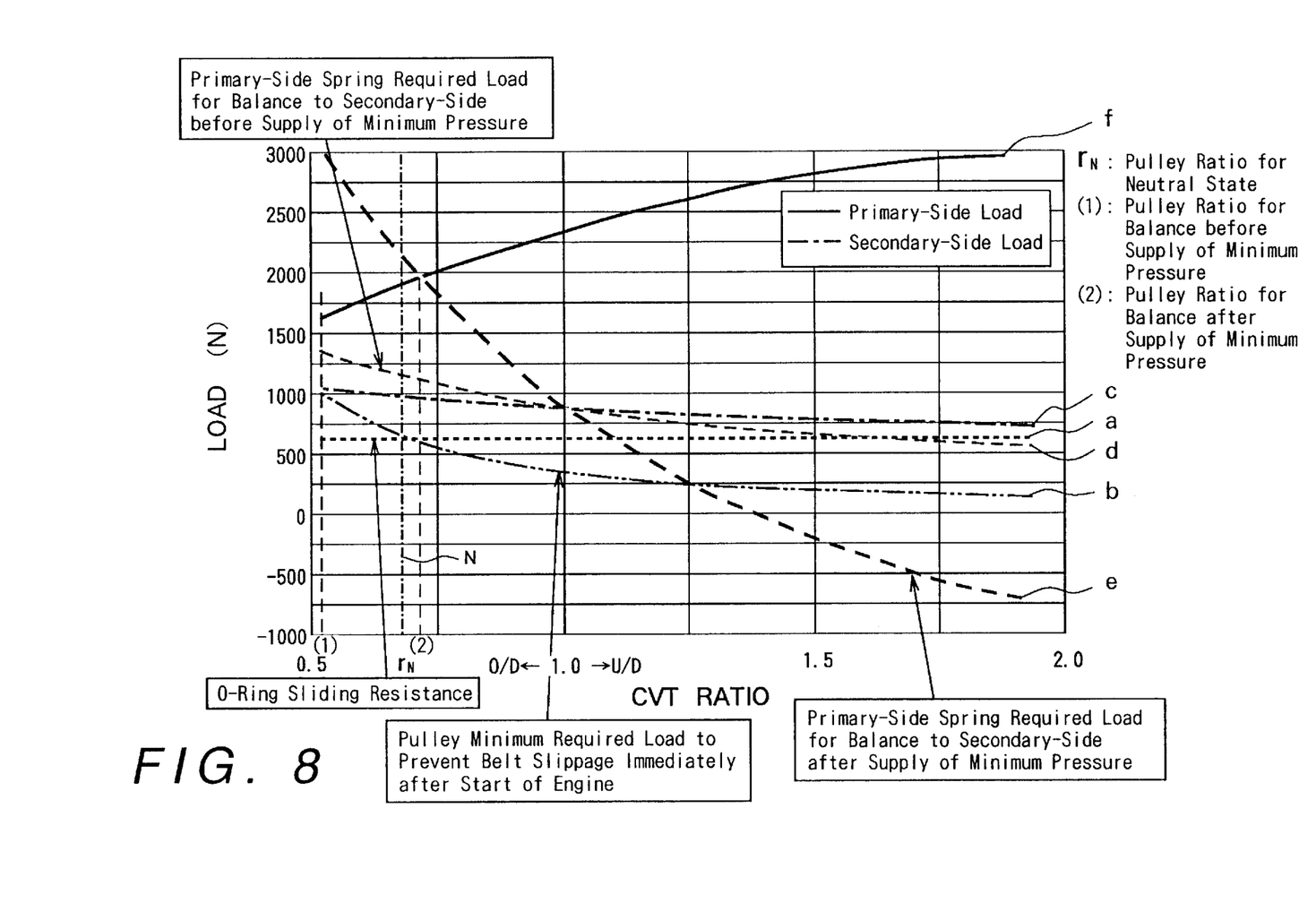
FIG. 8 is a graph illustrating another spring load setting to achieve predetermined pulley ratios.

The takeoff response delay is prevented by reducing the time required for the pulley ratio change. To produce the time reduction, the spring loads of the first and second pre-loading springs 65, 66 are set in a manner as shown in FIGS. 7, 8 which illustrate different embodiments of the load setting of the springs. According to the embodiment illustrated in FIG. 7, the loads of the springs 66, 67 are set so that the pulley ratio (1) occurring before the first and second hydraulic chambers 55, 56 are supplied with minimum fluid pressures (minimum required fluid pressures) is slightly greater than (within a predetermined range above) the pulley ratio $r_N$ corresponding to the neutral state. In contrast, according to the embodiment illustrated in FIG. 8, the loads of the springs 66, 67 are set so that the pulley ratio (2) occurring after the first and second hydraulic chambers 55, 56 are supplied with minimum fluid pressures is slightly greater than (within a predetermined range above) the pulley ratio $r_N$ for the neutral state.

These embodiments will be described in detail.

The O-ring sliding resistance is first determined (as indicated by the straight short dashed line a in FIG. 7). O-rings 7d, 9d are disposed between the outer peripheral face of the boss $7a_1$ of the stationary sheave 7a and the inner peripheral face of the movable sheave 7b of the primary pulley 7, and between the outer peripheral face of the boss $9a_1$ of the stationary sheave 9a and the inner peripheral face of the movable sheave 9b of the secondary pulley 9, as shown in FIG. 1. The O-rings 7d, 9d provide resistance when the movable sheaves 7b, 9b axially move to change the pulley ratio.

Next determined will be the pulley minimum required load to prevent the belt 10 from slipping immediately after the engine is started, as indicated by the curve b in FIG. 7. Below this load, the belt may fall off, or insufficient drive force transmission may result.

The spring load of the spring 66 of the secondary pulley 9 is set so that the load is always above the lines a and b (as indicated by the curve c). If the spring load of the spring 66 is excessively large, its resistances impedes the control or convergence of the pulley ratio to the pulley ratio $r_N$ for the neutral state. Therefore, the load of the spring 66 should preferably be set to a minimum possible level. The load of the spring 65 of the primary pulley 7 is set in the same manner.

Then the spring load of the primary pulley 7 that causes the primary pulley 7 to balance with the secondary pulley 9 before the first and second hydraulic chambers 55, 56 are supplied with minimum fluid pressure is determined (the curve d) under the conditions where the secondary-side spring 66 is mounted but the primary-side spring 65 is not mounted. In a similar manner, the primary-side spring load to cause the primary pulley 7 to balance with the secondary pulley 9 after the first and second hydraulic chambers 55, 56 have been supplied with minimum fluid pressure is determined (the curve e).

Finally, the spring load of the primary-side spring 65 (the curve f) is determined with reference to the curves d, e in the following manner.

As a precondition for the determination, the spring load of the primary-side spring 65 must be set greater than the spring load of the secondary-side spring 66 in order to establish a pulley ratio approximate to or within a predetermined range of the pulley ratio $r_N$ (<1) for the neutral state (that is, to shift the ratio toward the O/D side from a ratio equal to one). In addition, the embodiment illustrated in FIG. 7 sets the spring loads in accordance with the following relation between the pulley ratio (1) before supply of the minimum fluid pressure and the pulley ratio (2) after supply of the minimum fluid pressure:

$$\text{pulley ratio } r_N < \text{pulley ratio (1)} < \text{pulley ratio (2)} \qquad \text{formula 1}$$

The pulley ratio (1) is set slightly greater for the following reasons. Shifting to the D range is expected more often than shifting to the R range, immediately after start of the engine, that is, before fluid pressure rises. In addition, if pulley ratio (1)=pulley ratio $r_N$ is set, errors in the processing and assembly of the springs 65, 66 may result in the actual pulley ratio (1)<the pulley ratio $r_N$ after the assembly. The setting of pulley ratio $r_N$<pulley ratio (1) will prevent such a consequence, thus preventing reverse movement of the vehicle.

It is expected that the spring load of the primary-side spring 65 that satisfies the precondition and formula 1 will follow a curve symmetric to the spring load (curve c) of the secondary-side spring 66, with respect to a horizontal axis. Although the value of the load is not determined yet, the curve is expected to be like the curve f. The curve f is shifted along the ordinate axis and the abscissa axis to determined its position. The intersection of the curve f and the curve d represents the pulley ratio (1), and the intersection of the curve f and the curve e represents the pulley ratio (2). To summarize, the conditions are: the curve c<the curve f; the curves c, f are set to minimum; the pulley ratio (1) and the pulley ratio (2) are within the range between the pulley ratio $r_N$ and the pulley ratio equal to 1; and the pulley ratio (1) is closer to the pulley ratio $r_N$ than the pulley ratio (2) is to the pulley ratio $r_N$.

The spring load of the primary-side spring 65 is determined so that these conditions are satisfied.

According to the embodiment illustrated in FIG. 7, since the pulley ratio (1) before supply of the minimum fluid pressure becomes approximate to the pulley ratio $r_N$ for the neutral state solely on the basis of the load setting of the springs 65, 66, it is possible to prevent backward movement of the vehicle contrary to the intention of the driver when the driver shifts from vehicle stop range (P or N) to the D range (low mode) immediately after starting the engine, that is, before fluid pressure rises.

When the fluid pressure rises to a sufficiently high level, the pulleys balance at the pulley ratio (2). Since the spring loads of the springs 65, 67 are pre-set so that the pulley ratio changes to the neutral-state pulley ratio $r_N$ within the period between the start and the completion of engagement (connection) of the low clutch (running clutch) $C_L$, the embodiment prevents a takeoff response delay caused by the change from the pulley ratio (2) to the pulley ratio $r_N$.

Although this embodiment sets the spring load of the secondary-side spring 66 prior to the spring load of the primary-side spring 65, this setting sequence may be reversed. The reversed sequence is able to determine the spring load of the secondary-side spring 66 in substantially the same procedures as described above. However, since the reversed sequence will determine the curve c below the curve f and above the curves a and b, the requirements for determining the curve c will increase over those for determining the curve f according the embodiment of FIG. 7, thus resulting in more time and labor for the setting.

In the embodiment illustrated in FIG. 8, the spring loads are set so that the pulley ratio (2), after supply of the minimum fluid pressure, is slightly greater than (within a predetermined range above) the pulley ratio $r_N$ for the neutral state, in contrast to the embodiment of FIG. 7 where the pulley ratio (1), before supply of the minimum fluid pressure, is slightly greater than (within a predetermined range above) the neutral-state pulley ratio $r_N$. That is, the embodiment of FIG. 8 determines the spring load of the primary-side spring 65 so that the following condition is satisfied:

$$\text{pulley ratio (1)} < \text{pulley ratio } r_N < \text{pulley ratio (2)}$$

The embodiment of FIG. 8 determines the curves a–e in the same manner as in the embodiment of FIG. 7, but determines the curve f in a different manner.

The embodiment of FIG. 8 determines the position of the curve f so that pulley ratio (2) defined by the intersection of the curve f and the curve e is slightly greater than the neutral pulley ratio $r_N$. Since this determination manner makes it impossible to obtain an intersection of the curve f and the curve d, this embodiment sets the pulley ratio (1) to a value approximate to the pulley ratio at the far-end limit in the O/D side.

Although the pulley ratio (1)<the pulley ratio $r_N$, that is, a pulley ratio corresponding to the reverse drive, occurs before the fluid pressure rises, the pulley ratio (2), that is, the target pulley ratio, is slightly greater than the pulley ratio $r_N$ after the fluid pressure rises. Practically, it is rare for drivers to shift from the vehicle stop range to the D range (low mode) for takeoff immediately after starting the engine, that is, before the fluid pressure rise. In addition, even in such a rare case, backward movement can be prevented by controlling the timing of the engagement of the low clutch $C_L$ so that engagement occurs after the fluid pressure rises. Since in normal takeoff operation, drivers usually shift to the D range after a sufficient fluid pressure rise following start of the engine, it may be considered that this embodiment, using the pulley ratio (2) after the minimum fluid pressure supply being approximate to the pulley ratio $r_N$, is more suitably adapted to practical takeoff operations than the embodiment of FIG. 7.

Since the spring loads of the primary-side and secondary-side springs 65, 66 are set such that the pulley ratios (1), (2) before and after the minimum fluid pressure supply become approximate to the pulley ratio $r_N$ according to the embodiment of FIG. 7, or such that the pulley ratio (2) after the minimum fluid pressure supply becomes approximate to the pulley ratio $r_N$ according to the embodiment of FIG. 8, it is possible to reduce the time required for the pulley ratio to shift to the neutral-state pulley ratio $r_N$ during the takeoff operation. The embodiments thus effectively prevent the vehicle takeoff response delay.

As described above, the invention reduces the time required for the pulley ratio to shift to the pulley ratio $r_N$ corresponding to the neutral state during the vehicle takeoff operation and, thereby, eliminates the takeoff response delay by the setting the urging forces (spring loads) of the first urging means (the first spring 65) and the second urging means (the second spring 66). The setting method is not limited to the embodiments illustrated in FIGS. 7, 8, but other methods may be employed. For example, a method may be employed which simultaneously disposes in the pulleys 7, 9, a primary-side spring 65 and a secondary-side spring 66 whose spring load has been set less than that of the primary-side spring 65, examines a plurality of such pairs of springs as to whether the requirements of the pulley ratios (1), (2) are met, and determines the optimal pair to use.

The invention suitably sets spring loads of the springs 65, 66 such that the pulley ratio (1) based on the spring loads alone becomes approximate to the neutral-state pulley ratio $r_N$ according to the embodiment of FIG. 7, or such that the pulley ratio (2) based on the spring loads and the fluid pressure combined becomes approximate to the neutral-state pulley ratio $r_N$. The value of the neutral-state pulley ratio $r_N$ does not limit the invention.

While the invention has been described with reference to what are presently considered to be preferred embodiments thereof, it is to be understood that the invention is not limited to the disclosed embodiments. To the contrary, the invention is intended to cover various modifications and equivalent arrangements included within the spirit and scope of the appended claims.

According to the construction, the continuously variable transmission is able to quickly reach the pulley ratio $r_N$ corresponding to the neutral state changing from the pulley ratio $r_1$ in a case where it is necessary to establish the pulley ratio $r_N$ corresponding to the neutral state at the time of takeoff of a vehicle. Thus the invention reduces the response delay of the vehicle during taking-off caused by a change in the pulley ratio, enabling a smooth takeoff.

According to the construction, the continuously variable transmission is a simple construction in which the respective movable sheaves of the first and second pulleys are moved by the appropriate urging forces of the first and second springs.

According to the construction, the continuously variable transmission is able to achieve two pulley ratios $r_1$ and $r_N$ in accordance with the presence of pressure supply to the first and second hydraulic chambers.

According to the construction, the continuously variable transmission sets the pulley ratio occurring before the two hydraulic chambers are supplied with minimum required fluid pressure, that is, one of the two pulley ratios, to the pulley ratio $r_1$. Therefore, for example, in a case where a driver shifts the range immediately after starting the engine (that is, before the hydraulic chambers are supplied with the minimum required pressure), the continuously variable transmission is able to hold the vehicle stop state, thus preventing movements of the vehicle that are not intended by the driver.

According to the construction, the continuously variable transmission is based on an expectation that drivers more often will perform a shift from a vehicle stop range (the P range or the N range) to the D range than a shift therefrom to the R range, immediately after starting the engine, and an expected possibility that the pulley ratio may fail to become approximate to the pulley ratio $r_N$ corresponding to the neutral range because of errors in assembly or processing of the springs. By setting a pulley ratio $r_1$ biased to the forward drive state side, the continuously variable transmission is able to prevent rearward movements of the vehicle that are not intended by the driver.

According to the construction, the pulley ratio $r_N$ is achieved before the completion of engagement of the running clutch, the continuously variable transmission enables a quick takeoff of the vehicle.

According to the construction, the continuously variable transmission sets the pulley ratio occurring after the two hydraulic chambers are supplied with the minimum required fluid pressures, that is, the other one of the two pulley ratios as described above, to the aforementioned pulley ratio $r_1$, so that the pulley ratio $r_1$ can be brought approximately to the pulley ratio $r_N$ with a high precision. Thus the continuously variable transmission is able to further quicken the shift from the pulley ratio $r_1$ to the pulley ratio $r_N$, that is, it is able to very quickly achieve the neutral state when a driver shifts from the P range or the like to the D (drive) range.

What is claimed is:

1. A continuously variable transmission for a vehicle comprising:

an input shaft for being drivingly connected to an engine output shaft;

an output shaft for being drivingly connected to a wheel of the vehicle;

a belt-type continuously variable transmission apparatus having a first pulley drivingly connected to said input shaft, a second pulley provided on the side of said output shaft, a belt extending around the first and second pulleys, and axial force applying means for applying variable axial force to the pulleys to control a pulley ratio; and a planetary gear having a first rotary element connected to said input shaft, a second rotary element connected to said second pulley, and a third rotary element connected to said output shaft so that by changing the pulley ratio the variable transmission achieves a forward drive state, a neutral state, and a reverse drive state of the vehicle;

said axial force applying means including first constant urging means for applying a first axial urging force to said first pulley, and second constant urging means for applying a second axial urging force to said second pulley, and said first and second axial forces being set such that the pulley ratio is urged to a pulley ratio $r_1$ within a predetermined range of a pulley ratio $r_N$ where the variable transmission is in said neutral state.

2. A continuously variable transmission according to claim 1, wherein each of said first and second pulleys comprises a stationary sheave and a movable sheave that clamp said belt therebetween, and wherein said first and second urging means are first and second springs, respectively, that urge said movable sheaves to clamp said belt.

3. A continuously variable transmission according to claim 2, wherein said axial force applying means includes a first hydraulic chamber that receives a fluid pressure supply to urge the movable sheave of said first pulley in cooperation with said first spring, and a second hydraulic chamber that receives a fluid pressure supply to urge the movable sheave of said second pulley in cooperation with said second spring.

4. A continuously variable transmission according to claim 3, wherein each of said first and second urging forces of said respective first and second springs are set such that said pulley ratio $r_1$ is achieved before each of said first and second hydraulic chambers is supplied with a minimum required fluid pressure.

5. A continuously variable transmission according to claim 4, wherein said pulley ratio $r_1$ is a pulley ratio that achieves the forward drive state.

6. A continuously variable transmission according to claim 4, further comprising a running clutch that is engaged in a vehicle driving range; and wherein each of said first and second axial urging forces of said first and second springs are set such that within a period between a start and a completion of engagement of said running clutch, the pulley ratio occurring after each of said first and second hydraulic chambers is supplied with fluid pressure is about said pulley ratio $r_N$.

7. A continuously variable transmission according to claim 3, wherein each of said first and second urging forces of said first and second springs are set such that said pulley ratio $r_1$ is achieved after each of said first and second hydraulic chambers is supplied with a minimum required fluid pressure.

* * * * *

UNITED STATES PATENT AND TRADEMARK OFFICE
CERTIFICATE OF CORRECTION

PATENT NO. : 5,813,933
DATED : September 29, 1998
INVENTOR(S) : TSUKAMOTO et al

It is certified that error appears in the above-indentified patent and that said Letters Patent is hereby corrected as shown below:

In the last line of the title, "CUT" should read --CVT--.

Col. 1, line 5, "CUT" should read --CVT--.

Signed and Sealed this

Tenth Day of August, 1999

*Attest:*

Q. TODD DICKINSON

*Attesting Officer*    Acting Commissioner of Patents and Trademarks